United States Patent

[11] 3,552,271

| [72] | Inventors | Charles W. Suggs<br>1507 Trailwood Drive, Raleigh, N.C. 27606;<br>Larry F. Stikeleather, 7525 Parkview Drive, Greendale, Wis. 53129 |
|------|-----------|------|
| [21] | Appl. No. | 783,448 |
| [22] | Filed | Nov. 12, 1968 |
| [45] | Patented | Jan. 5, 1971 |

[54] VIBRATION DAMPING DEVICE
13 Claims, 4 Drawing Figs.

[52] U.S. Cl. .................................................. 91/360, 91/361
[51] Int. Cl. ................................................... F15b 20/00, F15b 13/16

[50] Field of Search .......................................... 91/390, 363, 217, 360, 361; 60/(Inquired)

[56] References Cited
UNITED STATES PATENTS
| 2,969,773 | 1/1961 | Henry ........................... | 91/363 |
| 3,028,175 | 4/1962 | Eckman ........................ | 91/390 |

*Primary Examiner*—Paul E. Maslousky
*Attorney*—John G. Mills III

ABSTRACT: In abstract, a preferred embodiment of this invention is a vibration attenuator which effectively isolates a load from a vibrating platform through an active load suspension system. This attenuator is particularly adaptable to the seats and cabs of offroad vehicles.

LARRY F. STIKELEATHER
CHARLES W. SUGGS
INVENTORS.

BY
ATTORNEY.

VIBRATION DAMPING DEVICE

This invention relates to vibration attenuators and more particularly to active suspension systems for greatly reducing the shock waves transmitted from a vibrating platform to a load supported on such platform.

There are many instances where it is desirable to prevent both random and nonrandom vibrations in a load supporting platform from being tramsitted to such load. A few examples of this are found in such diverse areas as the seats or cabs of vehicles, particularly offroad type vehicles which contain little or no chassis suspension for economic and functional reasons, as well as aircraft seats, particularly the seats of helicopters. In both of these examples, the load (the seat and its occupant) are to be shielded from the random vibrations found in the platform (the vehicle chassis) bouncing along over the rough earth in the vehicle or the rotating blade, landing and takeoff vibration found in the aircraft.

In the past, various dampening means have been used to reduce the transmission vibrations from a platform to a load. These devices have ranged from flat or coiled spring arrangements to extremely complex mechanical levers and shock induced fluid transfer systems. Almost universally, however, these systems have been passive as distinguished from active systems.

After much research and study into the above mentioned problems, Applicants have conceived a load suspension system which controls vibrations found in a load support platform so that such vibrations are not only dampened but effectively eliminated by active antiphase strokes. This greatly improved suspension system includes a vibration sensing means, an error compensator and an active source of motive power to respond to the corrected impulses of the sensor.

It is an object, therefore, of the present invention to provide a load suspension means which effectively attenuates vibrations from a supporting platform including a vibration sensing means, a signal error compensator and an active power source controlled by the compensator.

Another object of the present is to provide a vibration attenuating means between a load and its vibrating platform including means for sensing the vibrations in the platform, means for proportionally compensating for lag and lead in the sensing means; means to sense, analyze and compensate for variations in the vibration sensing means and the actual position of the load; and means to anticipate and compensate for lag in the antiphase active load support system.

Another object of the present invention is to provide in a vibration attenuating system a vibration sensor in the form of a suspended weight vibrometer.

Another object of the present invention is to provide in a vibration attenuator, a vibrometer which includes a spring loaded, floating weight operatively connected to an electrical control signal generator.

Another object of the present invention is to provide a vibration reducing system including a double-acting hydraulic cylinder which actively controls movement of a suspended load in response to signals from a vibration sensing means.

Another object of the present invention is to provide an electrohydraulic servovalve for controlling a double-acting hydraulic cylinder supporting a load.

An additional object of the present invention is to provide a vibration dampening system including an active hydraulic cylinder with terminal cushioning to reduce the shock encountered when the vibrations of the load supporting platform bottoms.

Other objects and advantages of the present invention will become apparent and obvious from a study of the following description and the accompanying drawings which are merely illustrative of the present invention.

Figure 1:
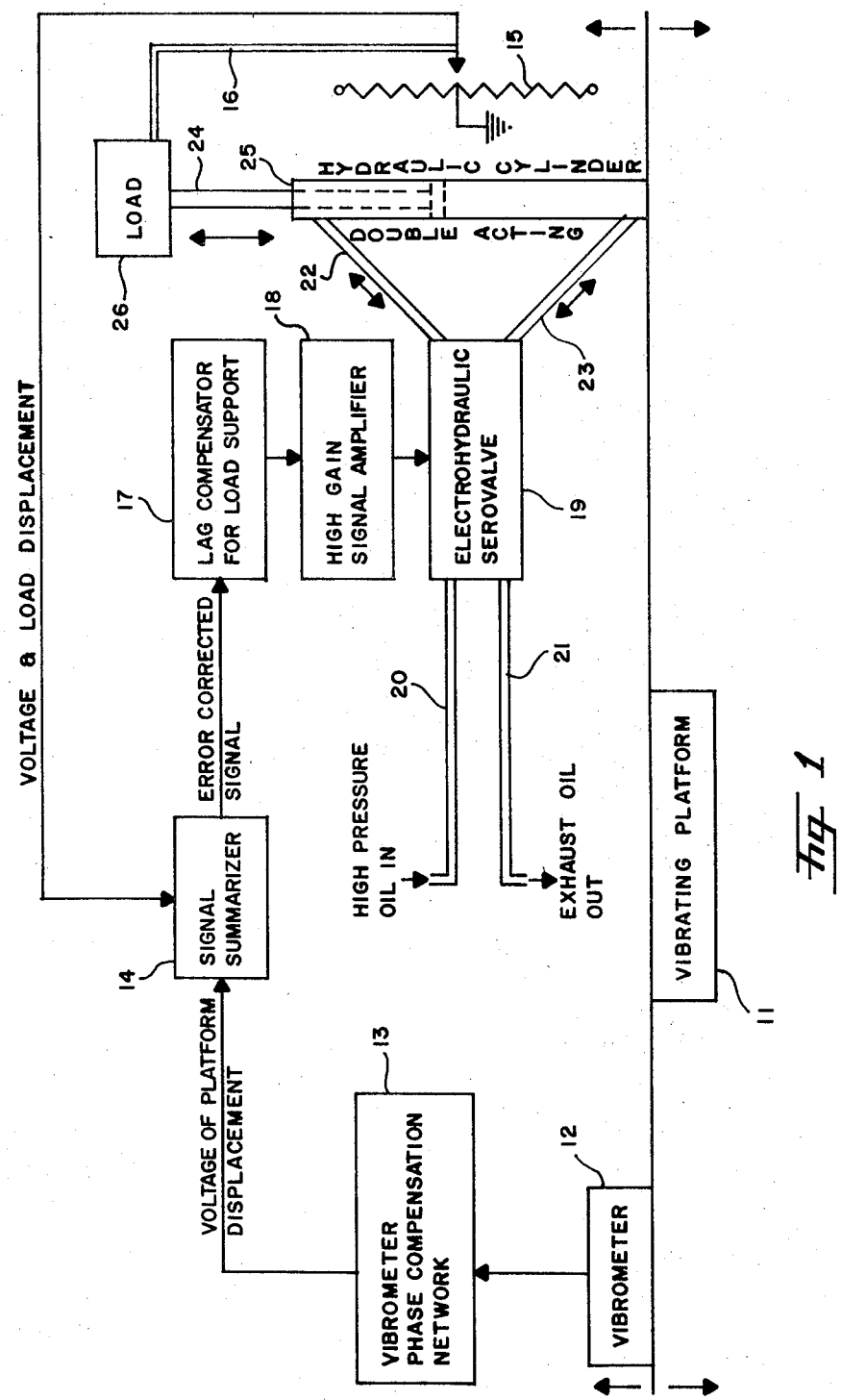
FIG. 1 is a schematic representation of the vibration attenuating device of the present invention.

With further reference to the drawings, a vibrating platform 11 into which vibrations are introduced has mounted thereon a vibrometer 12. This vibrometer is so constructed as to generate a voltage proportional to the displacement of the platform. This voltage is fed into a vibrometer phase compensation network 13.

The reason the phase compensator is necessary is that, except for frequencies appreciably below the natural frequency of the vibrometer, there is either a lag or a lead between the weight within the vibrometer (as will hereinafter be described in more detail) and the vibrating platform. This phase error is not constant but varies with frequency of the input. This makes it not practical to simply supply a fixed phase shift to correct phase error. the compensator or lag-lead network provides for a variable phase shift dependent upon frequency compensation and is designed to fit the characteristics of the vibrometer used. The specific details of a preferred type of lag-lead compensator will hereinafter be described in more detail.

The voltage from the compensating network 13 (which is directly proportional to the vibrating platform displacement) is fed into a signal summarizer 14. Also fed into this summarizer is a voltage directly proportional to the actual displacement of the load relative to the platform. The summarizer 14 analyzes and coordinates the displacement signal from the vibrometer and its compensator and the displacement signal of the load to assure that an inbalance between the two does not occur. This inbalance could easily occur should, for example, the upward motivator of the load react slightly faster than the lower motivator. To cause the load to slowly work itself down i until it was bottoming on downward signals and could only move when an upward signal was received. In other words the signal summarizer assures that when the vibrometer is at rest, the load will be centered between the limits of its travel.

Fed out of the signal summarizer 14 is an error-corrected signal of the vibration phases in the platform. This signal is fed into a lag compensator 17 for the active load support 25 which in essence anticipates the natural response lag found in all motivating systems.

The finally compensated signal is fed from the lag compensator 17 into a high-gain signal amplifier 18 to obtain adequate signal strength for the operation of the electrohydraulic servovalve 19.

As is standard in the operation of this type of servovalve, an oil inlet 20 and an oil exhaust 21 are provided. These are operatively connected to a closed center hydraulic system (not shown). The servovalve 19, through upper line 22, controls the downward movement of piston 24 within double-acting hydraulic cylinder 25. Lower line 23 controls the upward movement of the piston (as oriented in FIG. 1). Since load 26 is secured to piston 24, it moves relative thereto; or conversely, the moveable piston within cylinder 25 and its associated load, controlled by the input signal into the servovalve, remain stationary as the cylinder moves in phase with the vibrations of the platform.

Figure 3:
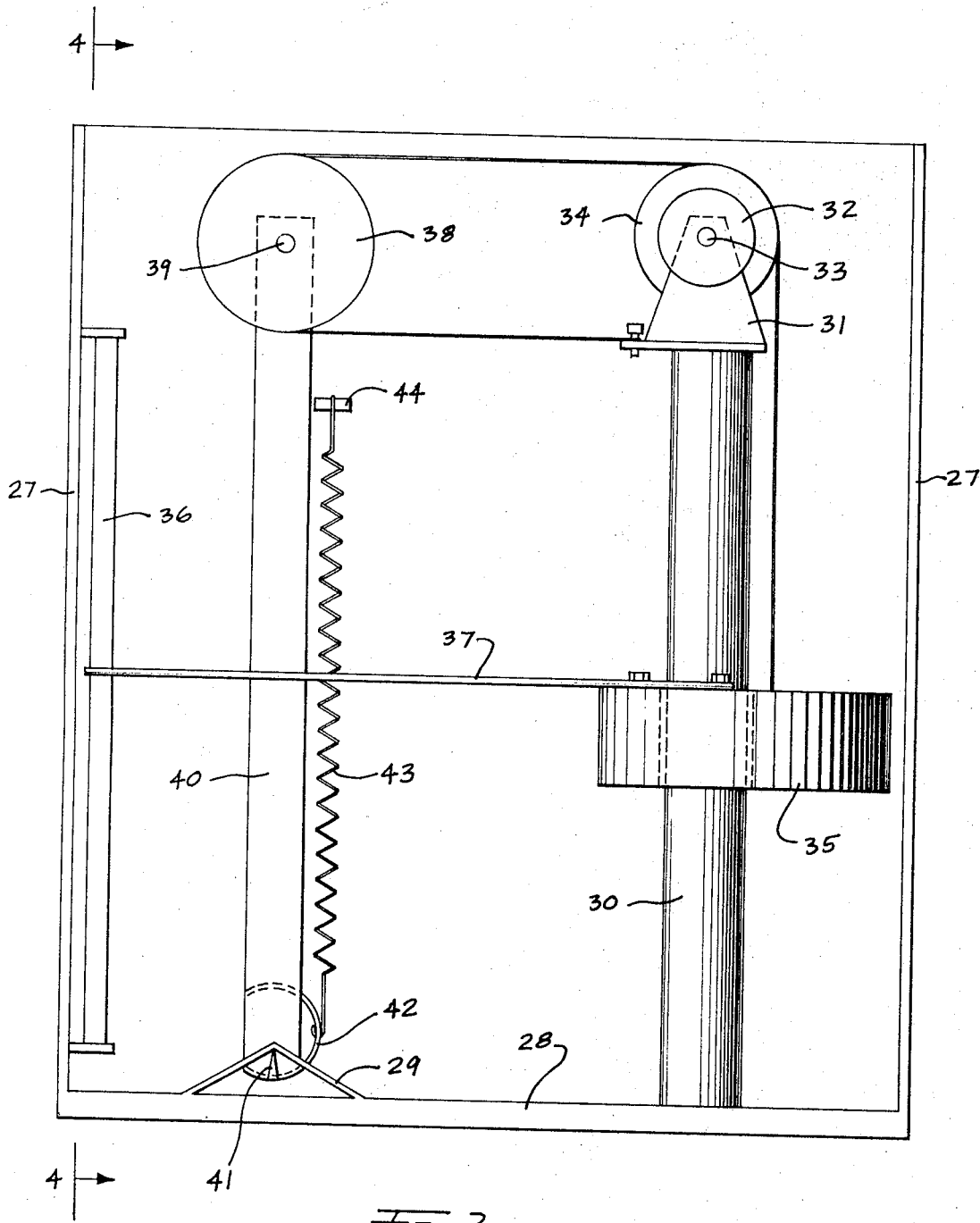
FIG. 3 is a side elevational view of a vibrometer that has been found satisfactory for use in conjunction with the attenuating system of the present invention.
Figure 4:
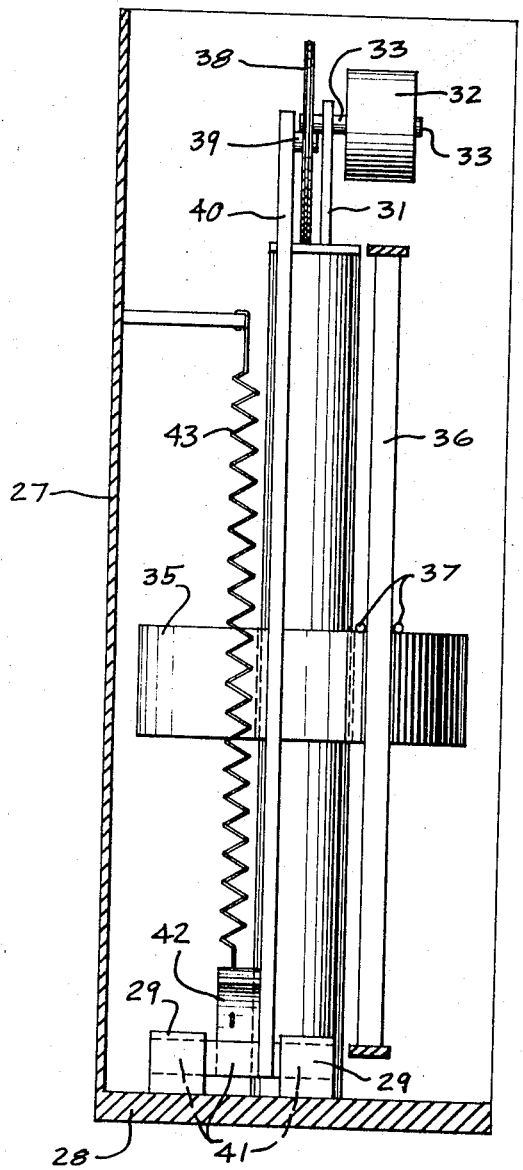
FIG. 4 is a section taken through lines 4–4 of FIG. 3.

The vibration sensing means indicated as vibrometer 12 can be constructed as shown in FIGS. 3 and 4. This particular structure includes wall portions 27 and a bottom portion 28. Secured to the bottom portion and projecting upwardly into the interior of the housing are a pair of inverted, V-shaped support brackets 29. Also secured to the bottom portion 28 and upwardly projecting into the interior of the housing is weight guide shaft 30. On the top of this shaft (as oriented in the drawings) is potentiometer mounting brackets 31. To this bracket is secured potentiometer 32. From this signal generating means or potentiometer extends a rotatable shaft 33 upon which is fixedly secured pulley wheel 34.

A weight 35 is mounted on the highly polished weight guide shaft 30. Although the shape of shaft 30 and the corresponding opening in weight 35 could be used to prevent undesirable rotation of the weight about a vertical axis, an additional means of preventing such motion is to mount a slide bar 36 on the housing wall generally parallel to guide 30. A control arm 37 is secured to weight 35 and extends outwardly therefrom to a point adjacent slide-bar 36 where such arm forks to slideably engage opposite sides of such bar.

To support the weight 35 "at rest" suspension generally in the center of guide shaft 30, a cable 45 is provided which is attached at one end to such weight. This cable passes around pulley wheel 34, around counterbalance pulley wheel 38 and is secured at its other end to bracket 31.

The last mentioned pulley wheel is rotatively mounted on axle shaft 39 which is in turn fixedly secured to counterbalance arm 40. At the opposite end of this arm from wheel 38 is a wedge-shaped, knife-edge bearing member 41 which is adapted to pivotally engage the apex of the inverted V-shaped support brackets 29, particularly as noted in FIG. 3.

A short spring mounting arm 42 is fixedly secured to counterbalance arm 40 in the area adjacent pivot member 41. To this mounting arm is attached one end of recoil spring 43. The other end of this spring is secured to any convenient fixed point such as spring mounting bracket 44 which is secured to wall portion 27.

The advantage of a vibration sensing means constructed as hereinabove described is that if a five-pound weight 35, for example, is used with a 6.3 inch counterbalance arm 40, the pulley and spring arrangement would give an actual spring tension of some 208 pounds when the weight and spring are in equilibrium. The reason for this, of course, resides in the fact that lever arm 42 is short as compared to lever arm 40. This gives a very soft springing action to the weight with only a very small spring travel relative to weight travel on shaft 30. In fact the vibrometer herein disclosed would have a spring travel of only 2.4 percent of the relative displacement of the weight 35.

Because of the natural frequency of the vibrometer system hereinabove described, the mass will hold a relatively fixed level in space as shaft 30 and its attached parts move up and down. This relative movement between guide shaft and weight causes the cable 45 to turn pulley 34 which, in turn, rotates the potentiometer 32 to give an electrical output proportional to the position of the weight on the shaft.

Figure 2:
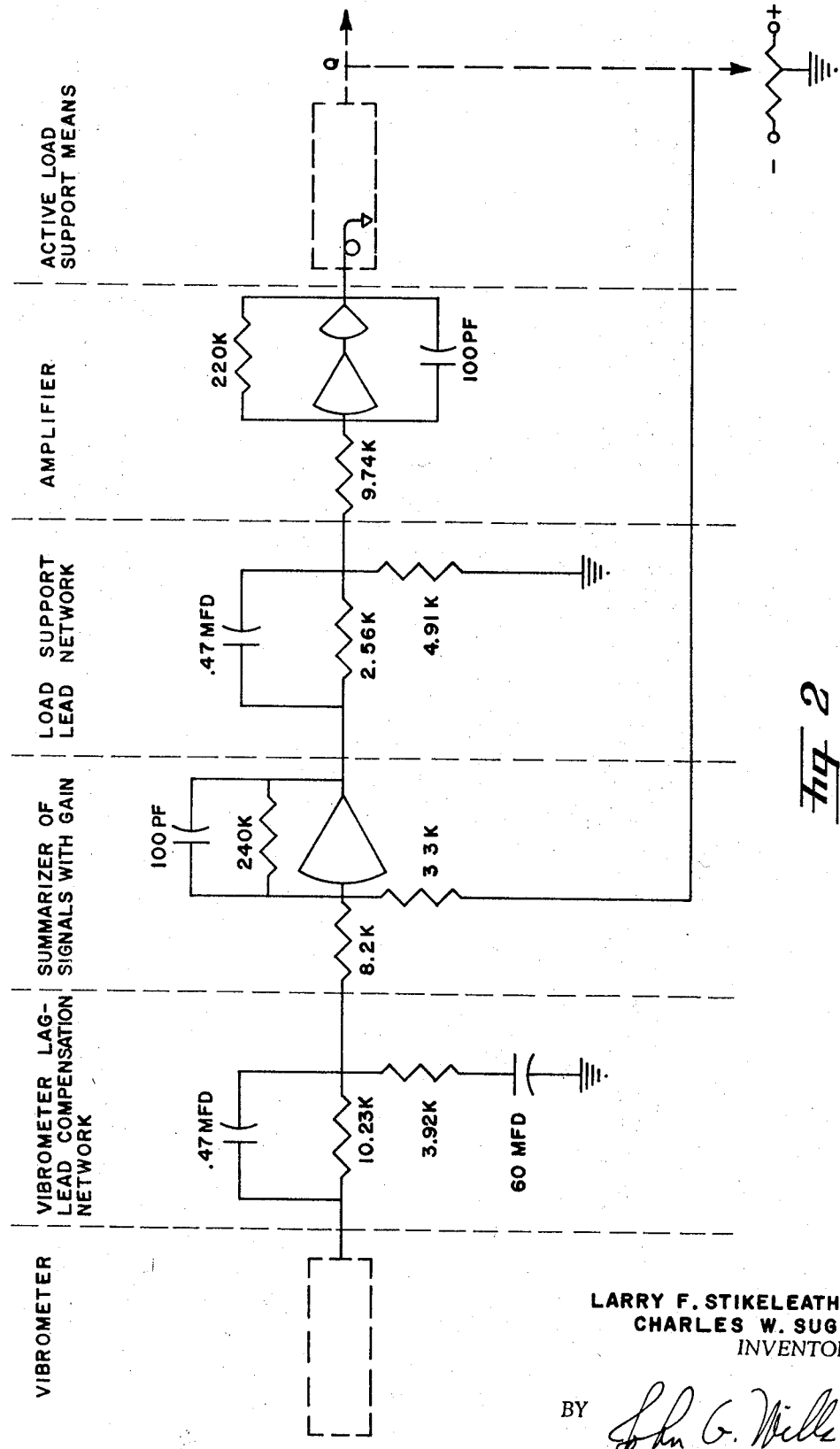
FIG. 2 is a schematic of the electronic proporting of such invention.

It has been noted analytically and experimentally that at lower vibration frequencies the vibrometer output signal leads too strongly while at higher vibration input frequencies additional phase lead is desirable for improved performance. To overcome this, a vibrometer lag-lead compensation network such as that disclosed in FIG. 2 has been adopted. This is the same type of signal compensator described on Page 270 of the text entitled "Introduction to Automatic Control Systems" by Robert N. Clark, Copywritten 1962 by John Wiley and Sons, Inc. New York, New York.

Once the weight's lag and lead have been compensated for, the compensated signals are fed into a summarizer of the lag-lead network signal and the relative load position indicator signal. To accomplish this combining of signals, an analogue computer arrangement such as the Philbrick EP85AU produced by Philbrick Researchers, Boston, Massachusetts, can be used. The adjusted output signal from the summarizer is amplified by an amplifier 46 of standard circuitry.

The summarized signal is then fed into a lead network which anticipates the slight lag in the active load support system which in this case has been described as a hydraulic system. This lag, of course, is between the electronic input signal and the actual response of the suspension system. To accurately compensate for this lag, a lead network as that disclosed at Page 37 of Clark, supra, has been found satisfactory and is thus shown in FIG. 2.

Since a relatively strong signal is necessary to activate an electrohydraulic servovalve of the type presently on the market (such as Moog, Catalog 740), a signal amplifier of standard design is provided. Since some adjustment may be necessary in the input signal to servovalve 19, a high-gain amplifier is preferably used.

Both potentiometer 32 as described within vibrometer 12 and the load position potentiometer 15 can be of any standard design so long as they operate so that their output is directly proportional to their operating displacement.

From the above, it is obvious that the present invention has the advantage of providing a system for almost completely eliminating vibrations between a vibrating platform and a load through highly efficient, yet relatively simple sensing and compensating stages. This invention also has the advantage of being relatively inexpensive to manufacture and yet sturdy and reliable in operation.

The terms "upper," "lower," "top," "bottom" and so forth have been used herein merely for convenience of the foregoing specification to describe the vibration dampening system and its associated parts as oriented in the drawings. It is to be understood, however, that these terms are in no way limiting to the invention since the system may obviously be disposed in many different positions when it is in operation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

We claim:

1. A vibration attenuating device between a vibrating platform and a load supported by such platform comprising: a vibration sensing means having an output signal proportional to vibrations; means operatively connected to said sensing means for correcting any error in said output signal; a relative position sensing means operatively connected between said platform and said load having an output signal directly proportional to the displacement therebetween; a signal summarizing means operatively connected to said signal correcting means and said relative position sensing means whereby an error corrected signal may be obtained; a motor actively supporting said load on said platform; and a signal responsive control means for said motor means operatively connected to said summarizing means whereby the load can be moved in antiphase to the vibration of said platform.

2. The device of claim 1 wherein the vibration sensing means is a vibrometer.

3. The device of claim 2 wherein the vibrometer is a spring counterbalanced weight.

4. The device of claim 3 wherein the vibrometer output signal is produced by a potentiometer operatively connected to said weight.

5. The device of claim 1 wherein a motor response lag anticipating means is operatively connected between said signal summarizing means and said control means.

6. The device of claim 1 wherein the motor means is hydraulically motivated.

7. The device of claim 6 wherein the hydraulic motor means is a double-acting hydraulic cylinder.

8. The device of claim 7 wherein the control means is an electrohydraulic servovalve.

9. A device for isolating the motion of a first body from a second body connected thereto comprising: a motion sensing means operatively associated with said first body and having an output signal proportional to said motion; a relative position sensing means operatively connected between said first and said second bodies having an output signal generally directly proportional to the displacement therebetween; error compensating means operatively connected to said motion sensing means for correcting errors in said output signal; a signal summarizing means operatively connected to said error compensating means and said position sensing means whereby an error corrected signal may be obtained; motor means forming at least a part of the connection between said first body and said second body; and signal responsive control means for said motor means operatively connected to said summarizing means whereby said second body can be moved in antiphase to the motion of said first body.

10. The device of claim 9 wherein the relative position sensing means is a potentiometer.

11. A device for isolating the motion of a first body from a second body connected thereto comprising: a motion sensing means operatively associated with said first body and having an output signal proportional to said motion; signal error compensating means operatively connected to said motion sensing means for correcting errors in said output signal; motor means forming at least a part of the connection between said first body and said second body; signal responsive control means for said motor means operatively connected to said error correcting means; and a motor responsive lag anticipating means operatively connected between said signal error compensating means and said motor control means whereby a better antiphase response is obtained.

12. A device for isolating the motion of a first body from a second body connected thereto comprising: a motion sensing means in the form of a spring counterbalanced, weight-type, vibrometer unit using a potentiometer to produce a motion responsive signal operatively associated with said first body and having an output signal proportional to said motion; signal error compensating means operatively connected to said motion sensing means for correcting errors in said output signal; motor means forming at least a part of the connection between said first body and said second body; and signal responsive control means for said motor means operatively connected to said error correcting means whereby said second body can be moved in antiphase with the motion of said first body.

13. A vibration attenuating device between a vibrating platform and a load supported by such platform comprising: a vibration sensing means having an output signal proportional to vibrations; a relative position sensing means operatively connected between said platform and said load having an output signal directly proportional to the displacement therebetween; a motor actively supporting said load on said platform; a signal responsive control means for said motor means operatively connected to said sensing means; and a signal summarizing means operatively connected between and to said vibration sensing means and said control means and to said relative position sensing means whereby an error correcting signal may be obtained to move the load in antiphase to the vibrations of said platform.